United States Patent [19]

Maeda et al.

[11] Patent Number: 4,686,087
[45] Date of Patent: * Aug. 11, 1987

[54] APPARATUS FOR THERMOPLASTIC RESINS PRE-EXPANDING PROCESS

[75] Inventors: Hirofumi Maeda, Takatsuki; Kyoichi Nakamura; Toshihiro Hatamoto, both of Osaka, all of Japan

[73] Assignee: Kanegafuchi Kagaku Kogyo Kabushiki Kaisha, Osaka, Japan

[*] Notice: The portion of the term of this patent subsequent to Jun. 18, 2002 has been disclaimed.

[21] Appl. No.: 700,180

[22] Filed: Feb. 11, 1985

Related U.S. Application Data

[62] Division of Ser. No. 647,661, Sep. 6, 1984, Pat. No. 4,524,154.

[30] Foreign Application Priority Data

Nov. 12, 1983 [JP] Japan ................................. 212870/83

[51] Int. Cl.$^4$ ........................... C08J 9/18; B01J 10/00
[52] U.S. Cl. ................................... 422/133; 422/112; 422/131; 521/60
[58] Field of Search ................... 432/13; 422/234, 130, 422/131, 133, 135; 209/172, 173; 210/523, 525; 521/56-60

[56] References Cited

U.S. PATENT DOCUMENTS

| | | | |
|---|---|---|---|
| 1,548,971 | 8/1925 | Ziska, Jr. ............................ | 209/173 |
| 3,671,026 | 6/1972 | Mills et al. . | |
| 3,743,694 | 7/1973 | Cichelli et al. ........................ | 521/60 |
| 3,811,822 | 5/1974 | Cherenson . | |
| 3,821,342 | 6/1974 | Hurd . | |
| 3,876,741 | 4/1975 | Klein . | |
| 4,063,565 | 12/1977 | Edwards et al. ...................... | 209/173 |
| 4,448,901 | 5/1984 | Senda et al. ........................ | 521/58 |

FOREIGN PATENT DOCUMENTS

| | | |
|---|---|---|
| 2107683 | 8/1972 | Fed. Rep. of Germany . |
| 2234504 | 7/1976 | Fed. Rep. of Germany . |
| 59-33123 | 2/1984 | Japan ................................. 521/60 |
| 2055380 | 3/1981 | United Kingdom . |
| 1588148 | 4/1981 | United Kingdom . |

Primary Examiner—Michael S. Marcus
Attorney, Agent, or Firm—Antonelli, Terry & Wands

[57] ABSTRACT

A process and apparatus for preparing pre-expanded particles of a thermoplastic resin which comprises; heating under an elevated pressure an aqueous dispersion comprising thermoplastic resin particles containing a volatile foaming agent and an aqueous medium in a pressure vessel; releasing the dispersion from the pressure vessel into a space within a sealed low-pressure vessel wherein the pressure is lower than that in the pressure vessel and the space is sealed with an aqueous medium which exists in the lower portion of the vessel and communicates with the outside of the vessel, whereby expanding the thermoplastic resin particles to give pre-expanded particles; and sinking the resulting pre-expanded particles under the aqueous medium by means of a rotary impeller provided in the pressure vessel so that the pre-expanded particles are taken out of the low-pressure vessel through the aqueous medium towards the outside of the vessel, while recovering the foaming agent volatilized from the thermoplastic resin particles by discharging the foaming agent out of the space in the low-pressure vessel with controlling the pressure in the low-pressure vessel to substantially a given pressure. According to the process, the release of the volatile foaming agent in the air is prevented, the productivity is increased and extraneous matters on the pre-expanded particles are removed.

4 Claims, 3 Drawing Figures

APPARATUS FOR THERMOPLASTIC RESINS PRE-EXPANDING PROCESS

This is a division of application Ser. No. 647,661, filed Sep. 6, 1984 now U.S. Pat. No. 4,524,154.

BACKGROUND OF THE INVENTION

The present invention relates to a process for preparing pre-expanded particles of a thermoplastic resin and apparatuses used in the process. More particularly, the present invention relates, in preparing the preexpanded particles where thermoplastic resin particles containing a volatile foaming agent which are dispersed in water under heating and an elevated pressure are released into a low-pressure area, to a process for taking the pre-expanded particles out of the system with recovering the foaming agent volatilized from the resin particles, and to apparatuses used in the process.

Up to now a process for preparing pre-expanded particles of a thermoplastic resin where foaming agent containing particles are released into a low-pressure area after they are dispersed in water in a pressure vessel, for example, autoclave, and stirred under high prerssure and high temperature is known as described in GE-OS (Offenlegungsschrift) No. 2,107,683, Japanese Patent Examined Publication No. 56-1344 and so on.

A description referring to preparing preexpanded particles of a thermoplastic resin is indicated in the above-mentioned publications. However, any description referring to processes for recovering the foaming agent and to apparatuses applied to the processes in preparing pre-expanded particles in industrial scale is not indicated. The foaming agent generated in preparing pre-expanded particles is released into the air without recovery. As a result, that causes problems such as air pollution and the worsening of working environment, and economical problems such as increase in the material cost.

SUMMARY OF THE INVENTION

It is an object of the present invention to provide a process for taking pre-expanded particles out of the system, simultaneously with recovering the volatile foaming agent in preparing pre-expanded particles of a thermoplastic resin.

The other object of the present invention is to provide an apparatus for taking pre-expanded particles out of the system simultaneously with recovering the volatile foaming agent.

These and other objects of the present invention will become apparent from the description hereinafter.

The present invention provides a process for preparing pre-expanded particles of a thermoplastic resin which comprises; heating under an elevated pressure an aqueous dispersion comprising thermoplastic resin particles containing a volatile foaming agent and an aqueous medium in a pressure vessel; releasing the dispersion from the pressure vessel into a space within a sealed low-pressure vessel wherein the pressure is lower than that in the pressure vessel and the space is sealed with an aqueous medium which exists in the lower portion of the vessel and communicates with the outside of the vessel, whereby expanding the thermoplastic resin particles to give pre-expanded particles; and sinking the resulting pre-expanded particles under the aqueous medium by means of a rotary impeller provided in the low-pressure vessel so that the pre-expanded particles are taken out of the low-pressure vessel through the aqueous medium which communicates with the outside of the vessel, while recovering the foaming agent volatilized from the thermoplastic resin particles by discharging the foaming agent out of the space in the low-pressure vessel with controlling the pressure in the low-pressure vessel to substantially a given pressure.

Moreover the present invention provides an apparatus for preparing pre-expanded particles of a thermoplastic resin which comprises: a pressure vessel for heating under an elevated pressure an aqueous dispersion comprising thermoplastic resin particles containing a volatile foaming agent and an aqueous medium; a release line the one end of which communicates with the pressure vessel and which is provided with a release outlet at the other end thereof; a low-pressure vessel in which the thermoplastic resin particles containing the volatile foaming agent in the aqueous dispersion released thereinto through the release outlet are pre-expanded and the volatile foaming agent contained in the particles is volatilized, the space in the low-pressure vessel being sealed with an aqueous medium which exists in the lower portion of the vessel and communicates with the outside of the vessel; a means for discharging the volatilized foaming agent from the low-pressure vessel and recovering it with controlling the inner pressure of the low-pressure vessel to substantially a given pressure; and a means for sinking the pre-expanded particles under the aqueous medium in the low-pressure vessel to take them out of the vessel through the aqueous medium which communicates with the outside of the vessel, the means comprising a rotary impeller provided in the low-pressure vessel.

The above-mentioned process and apparatus in accordance with the present invention have noticeable effects that the release of foaming agent in the air which causes air pollution, the worsening of working environment and increase in material cost can be prevented by discharging the foaming agent volatilized from the thermoplastic resin particles which are released into the space in the low-pressure vessel where the pressure is kept to a given pressure through a part of the space in the vessel and recovering it, and that the low-pressure vessel can be made smaller by sealing the low-pressure vessel with the aqueous medium which communicates with the outside of the vessel, sinking the pre-expanded particles under the aqueous medium to take them out of the vessel successively, which results in decrease in the equipment cost and increase in recovery rate of foaming agent, and that extraneous matters on the surface of the pre-expanded particles can be removed because the particles are sunk under the aqueous medium before taking out them.

DETAILED DESCRIPTION

Figure 1:
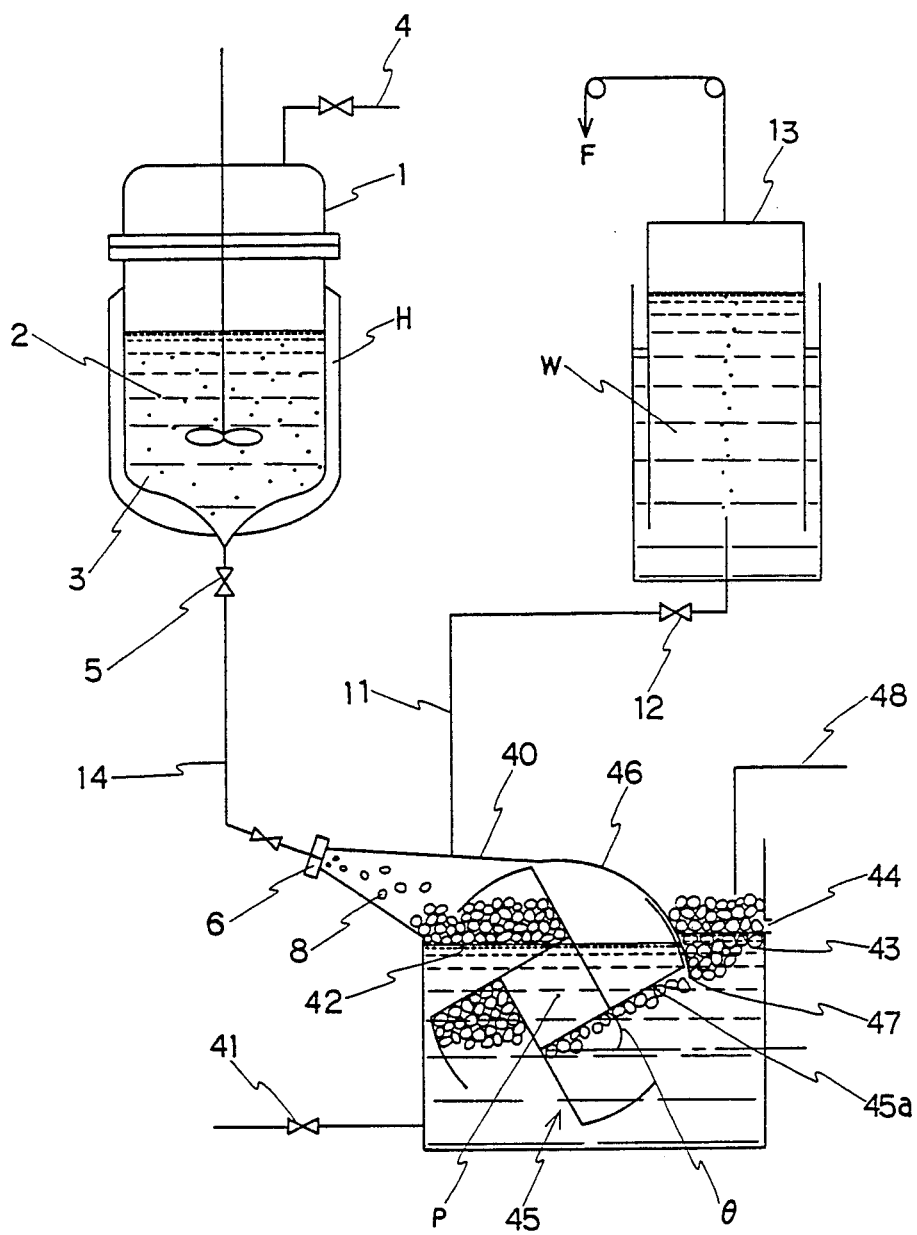
FIG. 1 is a schematic view showing an embodiment of an apparatus in accordance with the present invention.

Thermoplastic resins used in the present invention are not limited, if they can contain a volatile foaming agent and obtain a visco-elasticity suitable to expand when they are heated. Examples of the thermoplastic resin are styrene polymers such as polystyrene, high impact polystyrene, poly-α-methylstyrene, styrenemaleic anhydride copolymer, blend polymer of polyphenylene oxide and polystyrene, styrene-grafting polyphenylene oxide, styrene-acrylonitrile copolymer, acrylonitrile-butadiene-styrene terpolymer and styrene-butadiene copolymer; olefin polymers such as low density polyethylene, linear low density polyethylene, medium density polyethylene, high density polyethylene, polypropylene, ethylene-propylene copolymer, ethylene-vinyl acetate copolymer and ethylene-methyl methacrylate copolymer; vinyl chloride polymers; and methyl methacrylate polymers. Those thermoplastic resins can be used alone or as blends of two or more kinds thereof. Olefin polymers can be used as they are and those cross-linked with peroxide or by radiation can be also used.

In the present invention, the above-mentioned thermoplastic resins are used in the form of particle. The particles are prepared by usual manners such as suspension polymerization, and pulverization or cutting of pellet sheets or sticks made by means of extruder, calender roll or the like. The particles can be used in any forms, e.g., sphere, ellipsoid, cylinder, cube and rectangular prism. However, it is preferred that the particles are uniform in size in order to obtain uniform pre-expanded particles. The particles used for preparing pre-expanded particles for foaming within a mold are preferably in the form of sphere having a diameter of about 0.5 mm. to about 6 mm.

The volatile foaming agent (hereinafter simply referred to as "foaming agent") used in the present invention includes hydrocarbons, halogenated hydrocarbons, and the like, which have a boiling point of from $-50°$ C. to 100° C. Examples of the foaming agent are propane, butane, pentane, hexane, heptane, cyclopentane, cyclohexane, monochloromethane, dichloromethane, monochloroethane, trichloromonofluoromethane, dichlorodifluoromethane, dichloromonofluoromethane, trichlorotrifluoroethane and dichlorotetrafluoroethane. Those foaming agents can be used alone or as admixtures of two or more kinds thereof.

In the present invention, particles of a thermoplastic resin are impregnated with the foaming agent. The method for impregnating thermoplastic resin particles with a foaming agent includes a method where a foaming agent and thermoplastic resin particles are dispersed into water in a pressure vessel and heated under an elevated pressure, and the like. In that case, the foaming agent is used in an amount of 2 to 50 parts (parts by weight, hereinafter the same), preferably 5 to 40 parts, per 100 parts of the particles used. When the amount of the foaming agent is less than 2 parts, the recovery has no economical importance. When the amount of the foaming agent is more than 50 parts, the pressure is over the limit sufficient to impregnate the resin particles with the foaming agent, which results in waste of the foaming agent.

The thermoplastic resin particles impregnated with the foaming agent (hereinafter simply referred to as "foaming agent containing particles") obtained in the above manner are dispersed into water. It is preferable that the dispersing of the foaming agent containing particles in water is carried out in a pressure vessel, because the particles are prepared usually in the manner mentioned above. In that case, it is preferable that a small amount of dispersing agent is used to prevent adhesion between the particles during heating. Examples of the dispersing agent used for the purpose are water-soluble polymers such as polyvinyl alcohol, methyl cellulose and N-polyvinyl pyrrolidone, inorganic substances being slightly soluble in water such as calcium phosphate, magnesium pyrophosphate and zinc carbonate, combinations of the foregoing inorganic substances and a small amount of anionic surface active agents such as sodium dodecylbenzenesulfonate and sodium α-olefinsulfonate, and the like.

The foaming agent containing particles are used in an amount of 15 to 100 parts, preferably 25 to 70 parts, per 100 parts of water. When the amount of the particles is less than 15 parts, the productivity is lowered and the energy cost is increased. When the amount of the particles is more than 100 parts, adhesion between the particles is invited easily.

A pressure is applied to the aqueous dispersion thus obtained in the pressure vessel so that the pressure becomes 5 to 50 kg./cm$^2$. G, preferably 10 to 40 kg./cm$^2$. G after heating, and the dispersion is heated with agitating. The pressure under 5 kg./cm$^2$. G needs long time for releasing the dispersion and that over 50 kg./cm$^2$. G invites increase of the cost of the pressure vessel. The heating level varies depending on the melt index (MI) of the resin used, etc. Usually the aqueous dispersion is heated until the temperature overpasses the softening point of the resin and thereafter is kept at the same temperature.

The aqueous dispersion heated under an elevated pressure is released into a low pressure vessel, with introducing nitrogen gas, foaming agent, or the like into the pressure vessel in order to keep a given high pressure in the pressure vessel during releasing the dispersion. The aqueous dispersion is released into a space in the low-pressure vessel which is sealed under a give pressure lower than that in the pressure vessel through a release outlet such as orifice plate or nozzle which is provided at the other end of a release line communicating with the inside of the pressure vessel. The foaming agent containing particles released into the low-pressure vessel are expanded because the foaming agent contained in the particles is volatilized due to decrease in pressure.

In the present invention, the volatilized foaming agent is discharged from the space in the low-pressure vessel with controlling the pressure in the low-pressure vessel to a given pressure, and recovered through a recovery line. The foaming agent may be discharged by means of, for example, the increase in pressure in the low-pressure vessel due to the release of the aqueous dispersion, suctioning with a pump, or the like. Usually, in that case, the pressure in the low-pressure vessel is controlled so that it is substantially constant during the pre-expansion operation in order to obtain pre-expanded particles having a given constant pre-expansion ratio. The term "constant pressure" used in the invention is intended to mean that some deviation from an exact constant value is allowable. However, the pressure in the low-pressure vessel may be controlled so that it is increased or decreased with the lapse of time, when it is desired that the pre-expansion ratio varies during the pre-expansion operation.

The manner for controlling the pressure in the low-pressure vessel to a given constant pressure includes a manner wherein the pressure in the low-pressure vessel sealed with water is automatically regulated by using a pressure sensor, a pump and a microcomputer, a manner wherein a valve means which opens automatically when the pressure in the low-pressure vessel overpasses a given pressure is provided in a foaming agent recovery line, and the like.

Most of the water or aqueous solution released with the foaming agent containing particles is accumulated in liquid phase in the lower part of the low-pressure vessel. The liquid can be discharged out of the vessel by operating a valve provided at the lower part of the low-pressure vessel or through an overflow outlet which is provided near the surface of water in the outside of the vessel which communicates with the inside of the vessel. Furthermore fresh water can be supplied into the low-pressure vessel to wash extraneous matter away from the surface of the pre-expanded particles. The pre-expanded particles are accumulated on the liquid in the low-pressure vessel.

The foaming agent discharged from the low-pressure vessel is usually led to equipments used for refining, separating or collecting gases. The foaming agent thus recovered in a gaseous state may be used as a starting material for next pre-expansion procedure or stored after liquefied by means of a compressor, a condenser, or the like.

In accordance with the present invention, as a low-pressure vessel, there is employed a vessel sealed with water which communicates with the inside and the outside of the vessel, and pre-expanded particles accumulated in the low-pressure vessel are sunk under the water and taken out of the low-pressure vessel through the water which communicates with the outside of the vessel by means of a rotary impeller provided in the vessel, while the foaming agent is being recovered.

In such a manner, a small low-pressure vessel in volume is available to store pre-expanded particles, since the pre-expanded particles are taken out of the vessel successively. That leads to the low equipment cost and increase of the amount of the foaming agent recovered. Furthermore extraneous matters attached to the surface of the pre-expanded particles, for example, dispersants, can be washed away, since the pre-expanded particles are sunk under the water for sealing the low-pressure vessel before taken out of the vessel. When the sealing water is replaced with fresh water, the extraneous matters can be removed more effectively.

Now referring to FIG. 1, the process and apparatus of the present invention are described.

In FIG. 1, 1 shows a pressure vessel such as autoclave. The vessel 1 is provided with a gas line 4 with a valve for keeping the inner pressure of the vessel 1 to a high pressure; a stirrer for stirring an aqueous dispersion comprising foaming agent containing particles 2 and an aqueous solution 3; a heater H for heating the aqueous dispersion; and a valve 5 for releasing the aqueous dispersion.

An aqueous dispersion is prepared by mixing foaming agent containing particles 2 and an aqueous solution 3 in the pressure vessel 1. After pressurized through the gas line 4, if necessary, the aqueous dispersion is heated while stirred, so that it could be under a given condition in pressure and temperature. The aqueous dispersion under the given condition in pressure and temperature is led from the pressure vessel 1 to a release outlet 6 which is provided at the one end of a release line 14 connected to the lower part of the pressure vessel, through the release line 14 by opening the valve 5.

Through a trumpet-shaped coupling which widens toward the end of the outlet 6, the outlet 6 communicates with a low-pressure vessel 40 which is sealed with water existing in the lower part of the vessel. The low-pressure vessel 40 is provided with a recovery line 11 so that the foaming agent which is generated when foaming agent containing particles are expanded might be recovered, and the pressure in the low-pressure vessel 40 could be kept to a given pressure. The inside of the low-pressure vessel 40 communicates with its outside through the sealing water. The low-pressure vessel 40 is also provided with a pipe with a valve 41 for discharging the accumulated solution therefrom or replacing the solution with fresh water.

The aqueous dispersion under high temperature and high pressure led to the release outlet 6 is released through the outlet 6 into the space in the low-pressure vessel 40.

The foaming agent which is contained in the particles 2 in the aqueous dispersion released into the low-pressure vessel 40 volatilizes due to change in pressure, whereby the particles heated over the softening point are expanded. Pre-expanded particles 8 fall in the low-pressure vessel 40, while the volatilized foaming agent is discharged from a recovery line 11 through a valve 12 so that the pressure in the low-pressure vessel 40 could be kept to a given pressure. In that case, a Nash Hytor pump or the like can be used for suction. It may be also dishcarged by making difference in pressure between a collector 13 for foaming agent and the low-pressure vessel 40.

The collector 13 shown in FIG. 1 has a shape like an inverted bowl and is full of water W. The water is replaced with the foaming agent, whereby the foaming agent is collected in the collector 13. Such a collector is merely an example. Various type of collectors which are usually employed to collect gas can be also used. In the case of the collector 13 shown in FIG. 1, the pressure in the collector 13 can be regulated by changing the water level in it by means of force F. When the pressure in the collector 13 is regulated in such a manner, the amount of the foaming agent discharged from the vessel 40 can be controlled without using a pump or other means to discharge the foaming agent from the vessel 40.

The low-pressure vessel 40 is filled more and more with pre-expanded particles 8 and the solution 3. The amount of the solution accumulated in the low-pressure vessel 40 can be regulated by operating a valve 41 and the solution can be also replaced with fresh water. An overflow outlet 44 provided near the water surface 43 of the outside of the low-pressure vessel can be also used to discharge the solution.

Pre-expanded particles 8 are taken out of the low-pressure vessel 40 by the means mentioned below, while the low-pressure vessel is kept sealed and the foaming agent is recovered.

The water in the low-pressure vessel 40 seals the vessel and communicates the inside with the outside of the vessel. The separation wall 46 of the low-pressure vessel separates the water surface of the sealing water into two portions, the one 42 exists in the low-pressure vessel and the other 43 exists in the outside of the vessel. The vessel 40 is provided with a rotary impeller therein in order to sink pre-expanded particles 8 under the water and take them out of the vessel through the water which communicates with the outside.

In order to seal the low-pressure vessel 40 with water, the water levels 42 and 43 of the inside and outside of the low-pressure vessel respectively must be above the lower end 47 of the separation wall 46 of the low-pressure vessel 40. However, too high water level 42 causes decrease in efficiency, since the volume of the space of the vessel where pre-expanded particles are accumulated becomes smaller and the depth of water which the particles should be sunk becomes deeper. Therefore the preferable distance between the water level 42 and the lower end 47 of the separation wall 46 is about 10 cm. to about 50 cm.

A plate having many throughholes such as steel plate which passes water but no pre-expanded particles is employed preferably as the blades 45a of the rotary impeller 45.

For example, the rotary impeller 45 is arranged so that the rotation axis P thereof is substantially in parallel to the separation wall 46 of the low-pressure vessel 40. The rotary impeller 45 rotates about the rotation axis P thereof so that the outermost portions of the rotary impeller 45 are moved along the inner surface of the separation wall 46, as shown in FIG. 1. In the embodiment shown in FIG. 1, the pre-expanded particles 8 sunk by the rotary impeller 45 rise to the water surface 43 of the outside in the direction of the rotation thereof.

The separation wall 46 forms, in section, a part of the circumference of the circle with its center at the rotation axis P. Therefore it is preferable that the rotary impeller 45 is constructed such that the amount of pre-expanded particles 8 to be sunk by the rotary impeller is as large as possible and the sunk pre-expanded particles rise to the water surface 43 beyond the lower end 47 of the separation wall 46 in taking them out of the low-pressure vessel. Namely, it is preferably constructed such that the clearance between the outermost portions of the rotary impeller 45 and the lower end 47 of the separation wall 46 is made small and the pre-expanded particles do not rise to the water surface 42 of the inside of the low-pressure vessel. However, the number of blade and the like is not limited. Almost all of pre-expanded particles 8 sunk by the rotary impeller 45 come to the water surface 43 of the outside, when angle $\theta$ that the blade 45a of the rotary impeller makes with horizontal plane becomes about 30° or more.

Pre-expanded particles 8 floating on the water surface 42 are sunk under the water by the rotary impeller 45 and come to the water surface 43 of the outside by buoyancy through the water which communicates the inside of the low-pressure vessel 40 with its outside. The pre-expanded particles come to the water surface 43 is taken out by overflow but can be taken out, for instance, by means of a suction pump 48 or the like.

Figure 2:
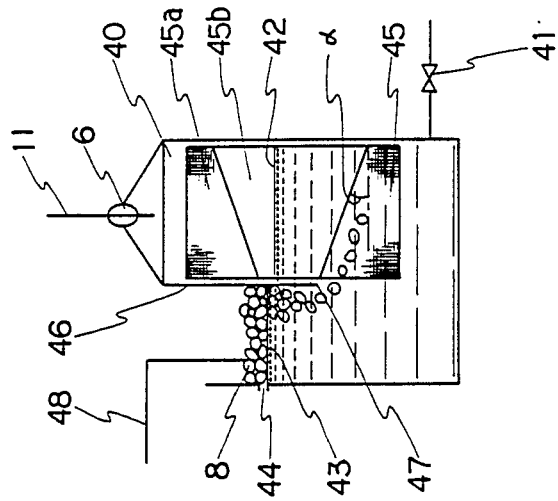
FIG. 2 is a schematic view showing another example of the low-pressure vessel section in the apparatus of FIG. 1.
Figure 3:
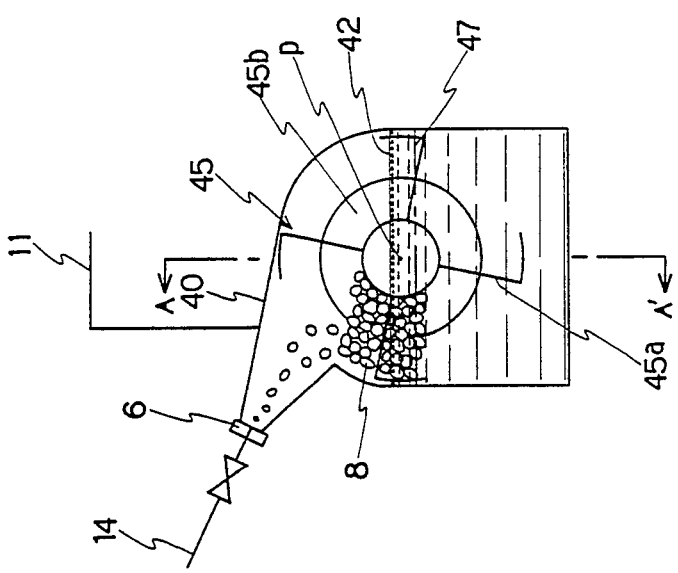
FIG. 3 is a section view of FIG. 2 along the line A—A'.

FIG. 2 shows an outline of another embodiment of the means for taking out the pre-expanded particles using the rotary impeller in accordance with the present invention and FIG. 3 is a section view of FIG. 2 along the line A—A'.

In this embodiment, the axle portion 45b of the rotary impeller 45 to the outer surface of which blades 45a are attached takes the shape of truncated cone where the diameter of this side of FIG. 2 is different from that of the opposite side. The rotary impeller is arranged so that the rotation axis P thereof meets at right angles with the separation wall 46 of the low-pressure vessel, and the smaller end of the truncated cone-shaped axle portion 45b is positioned near the separation wall 46. As shown in FIG. 3, pre-expanded particles 8 scattering in the low pressure vessel 40 and floating on the water surface 42 are caught by the blades 45a of the rotary impeller 45 and sunk under the water surface 42. When the sunk pre-expanded particles 8 are moved under the axle portion 45b of the rotary impeller 45 by rotation thereof, they are moved towards the smaller end of the axle portion 45 by the buoyancy of the particles due to its shape of truncated cone and rise to the water surface 43 of the outside of the low-pressure vessel. Thus, in this embodiment, the pre-expanded particles are taken out in the direction along the rotation axis P of the rotary impeller. Angle $\alpha$ that the side of the truncated cone-shaped axle portion 45b makes with water surface varies depending on the capacity and the number of revolution of the rotary impeller. However, it is preferable that the angle $\alpha$ is from 20° to 60° and is more preferably from 35° to 50° When the angle $\alpha$ is less than 20°, it often happens that all the pre-expanded particles do not rise to the water surface 43 sufficiently. When the angle $\alpha$ is more than 60°, the transfer capacity of pre-expanded particles per hour decreases due to the smaller capacity of the rotary impeller.

By the above-described process where the apparatus shown in FIGS. 1, 2 and 3 are used, 65 to 80 % of the foaming agent used for preparing the foaming agent containing particles can be recovered. Accordingly release of foaming agent into the air which causes air pollution, the worsening of working environment and increase in the material cost can be reduced. Furthermore, the pre-expanded particles can be taken out of the low-pressure vessel under the condition that the vessel is sealed. Therefore, the low-pressure vessel is made small and the pre-expanded particles can be prepared continuously, which results in increase in the productivity. And extraneous matters on the surface of the pre-expanded particles can be washed away, since the pre-expanded particles are sunk under water before taking out them.

In addition to the elements and parts used in the Embodiments, other elements and parts can be used in the Embodiments as set forth in the specification to obtain substantially the same results.

The present invention is more particularly described and explained by means of the following Examples. These Examples are intended to illustrate the invention and not be construed to limit the scope of the invention. It is to be understood that various changes and modifications may be made in the invention without departing from the spirit and scope thereof.

EXAMPLE 1

This example was carried out using the apparatus shown in FIG. 1.

A 150 l pressure vessel equipped with a stirrer was charged with 300 parts (75 kg.) of water, 100 parts (25 kg.) of pellets (cylindrical form) of ethylenepropylene random copolymer having a density of 0.90 g./cm$^3$., MI of 9 and an ethylene content of 4.5 % by weight, and 0.5 part of powdered basic calcium tertiary phosphate and 0.025 part of sodium dodecylbenzenesulfonate as dispersing agent. The mixture was stirred to give an aqueous dispersion. After introiucing 30 parts (7.5 kg.) of dichlorodifluoromethane into the pressure vessel under pressure with stirring the dispersion, the temperature was raised to 136° C. The pressure in the pressure vessel at that time was 26 kg./cm$^2$. G.

By opening the valve 5 in the release line 14, the aqueous dispersion was released from the pressure vessel into a low-pressure vessel sealed with water and having a space volume of 32 l through orifices of 3 mm. in diameter bored in an orifice plate with keeping the pressure in the pressure vessel to 30 kg./cm$^2$. G by feeding nitrogen gas, whereby the pellets were expanded to give pre-expanded particles.

Since dichlorodifluoromethane and the like volatalized from the pellets increased the pressure in the low-pressure vessel during pre-expanding, the valve 12 provided in the recovery line 11 was opened to keep the pressure in the low-pressure vessel to around atmospheric pressure (0.97 to 1.05 kg./cm². absolute).

The generated foaming agent was discharged through the recovery line and collected in a collector like an inversed bowl. The formed pre-expanded particles were sunk under water and taken out of the low-pressure vessel by means of a rotary impeller. The rotary impeller and the separation wall 46 were arranged such that most of the pre-expanded particles rose to the water surface 43 of the outside when the angle $\theta$ become 45°.

When pre-expanding was finished, 0.16 kg. and 2.5 kg. of dichlorodifluoromethne in the low-pressure vessel and the pressure vessel was respectively left. And 3.34 kg. of dichlorodifluoromethane in a gaseous state was collected in the collector. Then the dichlorodifluoromethane in the pressure vessel, the low-pressure vessel and the collector was liquefied and recovered. The amount of dichlorodifluoromethane released into the air was actually 1.66 kg. And the amount of the pre-expanded particles obtained was about 800 l. The amount of the pre-expanded particles taken out per hour was about 90 kg.

In the case of this example, fresh water was not used to wash the pre-expanded particles. However, since the pre-expanded particles were sunk under water before taking out them, that brought good effect to wash away extraneous matters on the particles. The amount of extraneous matters (mainly calcium tertiary phosphate) on the pre-expanded particles obtained was 1000 ppm.

EXAMPLE 2

This example was carried out using the apparatus shown in FIG. 1.

A 1,000 l pressure vessel equipped with a stirrer was charged with 300 parts (500 kg.) of water, 100 parts (167 kg.) of pellets (cylindical form) of ethylene-propylene random copolymer having a density of 0.90 g./cm³., MI of 9 and an ethylene content of 4.5 % by weight, and 0.5 part of powdered basic calcium tertiary phosphate and 0.025 part of sodium dodecylbenzenesulfonate as dispersing agent. The mixture was stirred to give an aqueous dispersion. After introducing 30 parts (50 kg.) of dichlorodifluoromethane into the pressure vessel under pressure with stirring the dispersion, the temperature was raised to 136° C. The pressure in the pressure vessel at that time was 26 kg./cm². G.

By opening the valve 5 in the release line 14, the aqueous dispersion was released from the pressure vessel into a low-pressure vessel sealed with water and having a space volume of 42 l through orifices of 3 mm. in diameter bored in an orifice plate with keeping the pressure in the pressure vessel to 30 kg./cm². G by feeding nitrogen gas, whereby the pellets were expanded to give pre-expanded particles.

Since dichlorodifluoromethane and the like volatalized from the pellets increased the pressure in the low-pressure vessel during pre-expanding, the valve 12 provided in the recovery line 11 was opened to keep the pressure in the low-pressure vessel to around atmospheric pressure (0.97 to 1.05 kg./cm². absolute).

The generated foaming agent was discharged through the recovery line and collected in a collector like an inversed bowl. The formed pre-expanded particles were sunk under water and taken out of the low-pressure vessel by means of a rotary impeller. The rotary impeller and the separation wall 46 were arranged such that most of the pre-expanded particles rose to the water surface 43 of the outside when the angle $\theta$ become 45°.

When pre-expanding was finished, 0.21 kg. and 16.7 kg. of dichlorodifluoromethane in the low-pressure vessel and the pressure vessel was respectively left. And 23.36 kg of dichlorodifluoromethane in a gaseous state was collected in the collector. Then the dichlorodifluoromethane in the pressure vessel, the low-pressure vessel and the collector was liquefied and recovered. The amount of dichlorodifluoromethane released into the air was actually 9.94 kg. And the amount of the pre-expanded particles obtained was about 5,300 l. The amount of the pre-expanded particles taken out per hour was about 130 kg.

COMPARATIVE EXAMPLE

The same procedures as in Example 1 except that an opened vessel was used as a low pressure vessel, the generated foaming agent was not recovered and released into the air, and the pre-expanded particles were taken out of the vessel without sinking them under water were repeated to obtain pre-expanded particles.

The amount of extraneous matters (mainly calcium tertiary phosphate) attached to the pre-expanded particles obtained was 1,500 ppm.

What we claim is:

1. An apparatus for preparing pre-expanded particles of a thermoplastic resin which comprises a pressure vessel for heating under an elevated pressure an aqueous dispersion comprising thermoplastic resin particles containing a volatile foaming agent and an aqueous liquid; a low-pressure vessel for pre-expanding said thermoplastic resin particles; release line means for releasing the aqueous dispersion from the pressure vessel into the low-pressure vessel; said low-pressure vessel comprising wall means defining a closed portion and an open portion, and a separation wall; the thermoplastic resin particles containing the volatile foaming agent released through said release line means being pre-expanded and the volatile foaming agent contained in the particles being volatilized within said closed portion, said closed portion and open portion bein partitioned by the separation wall which has a lower end spaced from a bottom wall of the low-pressure vessel, and said closed portion and said open portion communicating with each other through a space between the lower end of said separation wall and the bottom wall of said low-pressure vessel; means for maintaining a liquid level in the closed portion and a liquid level in the open portion above said lower end of the separation wall so that a sealed space is formed in the closed portion; means for discharging the volatilized foaming agent from the closed portion of the low-pressure vessel and for controlling the inner pressure within the closed portion at a pressure lower than that in said pressure vessel; and removal means for removing the pre-expanded particles from the closed portion; said removal means comprising a rotary impeller partially submerged within the aqueous liquid within said closed portion of the low-pressure vessel, said rotary impeller being arranged such that the pre-expanded particles accumulated on the liquid surface within the closed portion are caught by the impeller, submerged under the liquid surface with revolution of the impeller and forced towards the open portion of the low-pressure vessel through the aqueous liquid.

2. The apparatus of claim 1, wherein the blades of the rotary impeller have throughholes through which the aqueous fluid is passed but the pre-expanded particles are not passed.

3. The apparatus of claim 1, wherein the rotary impeller is arranged so that the rotation axis thereof is in parallel to the separation wall of the low-pressure vessel, whereby the pre-expanded particles submerged by the rotary impeller rise to the fluid surface in the open portion of the low-pressure vessel in the direction of the rotation thereof.

4. The apparatus of claim 1, wherein the rotary impeller has a truncated cone-shaped axle portion, and the rotary impeller is arranged so that the rotation axis thereof meets at right angles with the separation wall of the low-pressure vessel, and the smaller end of the truncated cone-shaped axle portion is positioned near the separation wall, whereby the pre-expanded particles submerged by the rotary impeller rise to the fluid surface in the open portion of the low-pressure vessel in the direction along the rotation axis of the rotary impeller.

* * * * *